May 19, 1970 — H. D. DAIGH — 3,512,509
CONTROL MECHANISM FOR EXHAUST RECYCLE SYSTEM
Filed April 10, 1969 — 2 Sheets-Sheet 1

INVENTOR.
HAROLD D. DAIGH
BY Donald W Canady
ATTORNEY

May 19, 1970     H. D. DAIGH     3,512,509
CONTROL MECHANISM FOR EXHAUST RECYCLE SYSTEM
Filed April 10, 1969     2 Sheets-Sheet 2

INVENTOR.
HAROLD D. DAIGH
BY
*Donald W Canady*
ATTORNEY

United States Patent Office
3,512,509
Patented May 19, 1970

3,512,509
CONTROL MECHANISM FOR EXHAUST RECYCLE SYSTEM
Harold D. Daigh, Rolling Hills Estates, Calif., assignor to Atlantic Richfield Company, New York, N.Y., a corporation of Pennsylvania
Original application Aug. 7, 1967, Ser. No. 658,903. Divided and this application Apr. 10, 1969, Ser. No. 814,927
Int. Cl. F02m 25/06
U.S. Cl. 123—119                    7 Claims

ABSTRACT OF THE DISCLOSURE

A control mechanism for exhaust recycle systems used with internal combustion engine vehicles. The control mechanism comprises thermally activated valve means mounted in the exhaust recycle conduit for preventing the recycle of exhaust gases if a sensed temperature corresponding to that of the engine, such as the induction system temperature, is below a predetermined level. The temperature sensitive valve means is a bimetallic strip of two metals having different coefficients of thermal expansion.

RELATED APPLICATION

This application is a divisional application of Ser. No. 658,903, filed Aug. 7, 1967, now U.S. Pat. No. 3,457,906.

BACKGROUND OF THE INVENTION

Internal combustion engine driven vehicles equipped with exhaust recycle systems sometimes exhibit poor starting characteristics in very cold weather due to a dilution of the fuel mixture by recycled gases and intake of cool air from the heat riser channel through the recycle system during starting. The exhaust recycle valve of such systems is normally operated conjointly with the accelerator floor pedal. Thus, as the floor pedal of the automobile is depressed for starting, the exhaust recycle valve is opened permitting a large amount of cool air to circulate into the recycle manifold of the automobile.

SUMMARY OF THE INVENTION

This invention is basically an improvement on prior art exhaust recycle systems to correct the occasionally experienced cold weather starting difficulties. This improvement comprises the inclusion of thermally activated control mechanism in the exhaust recycle system for preventing recirculation of exhaust vapors at low temperatures. The mechanism includes a member for sensing the temperature of the engine or its related components which vary in temperature in correspondence with the engine temperature. This is accomplished by the use of a valve comprising a bimetallic thermally expansible strip mounted in the induction manifold at the inlet portion of the exhaust recycle line in the heat riser. When the temperature of the vapors in the heat riser is below a predetermined minimum, the bimetallic strip seats tightly against the exhaust recycle inlet preventing recycle of the cool air in the heat riser. As the temperature in the heat riser increases, the thermal valve unseats from the inlet to the recycle conduit permitting recycle of exhaust gases to occur in accordance with the design of the system.

One object of this invention is to provide a thermal control device for an exhaust recycle mechanism which prevents recycling of exhaust gases into the combustion chambers of an internal combustion engine when the engine temperature is below a predetermined level.

Still another object of this invention is to provide an exhaust recycle system for an internal combustion engine wherein cool gases are not recycled to the engine combustion chambers during start up in cold weather.

These and other objects of this invention will become more apparent from consideration of the following description and appended claims when taken in conjunction with the drawings.

DESCRIPTION OF PREFERRED EMBODIMENT

Figure 1:
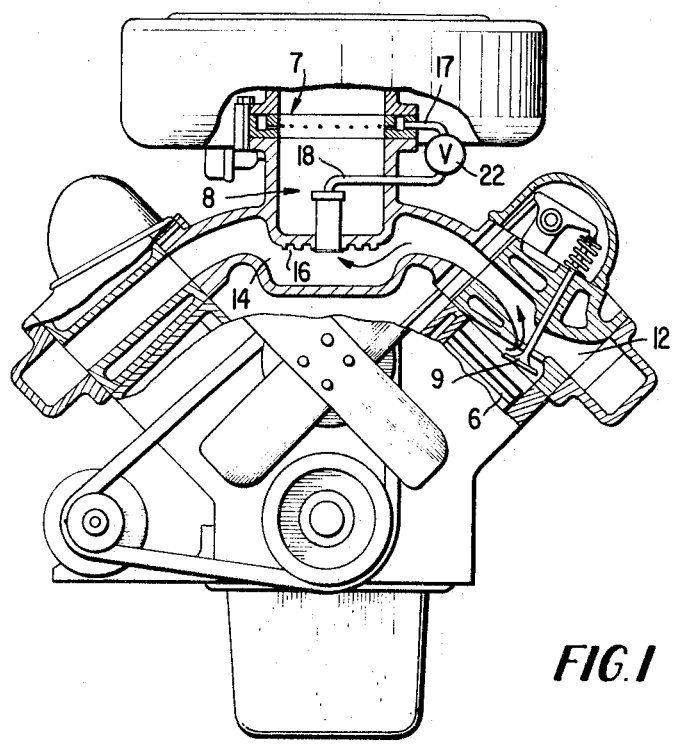
FIG. 1 is a front elevation, partially in section, of an internal combustion engine showing the path of exhaust gases through the heat riser.

Referring to the drawings, FIG. 1 is a cross-section through a conventional V-8 internal combustion engine showing one of the combustion chambers 6, a carburetor 7, and an induction system 8. Exhaust gas is discharged into the exhaust manifold 12 and the heat riser channel 14 from chamber 6 when exhaust valve 9 is opened during the exhaust cycle. A conventional heat riser passageway or channel 14 conveys a portion of the exhaust gas from one or more of the exhaust outlets to preheat or vaporize the air-fuel mixture passing through the induction system into the intake manifold by heat exchange through a hot plate 16. An exhaust recycle system is described in my U.S. Pat. No. 3,237,615, issued Mar. 1, 1966.

The hot plate section of the conventional heat riser is used to heat and vaporize the air-fuel mixture coming from the carburetor prior to its passage into the combustion chamber through the intake manifold. The hot recycled exhaust gas may also be used to heat and vaporize the air fuel mixture within the intake manifold while cooling the exhaust gas prior to its injection into the induction system. While the total heat content of the charge is not altered within the confines of the induction system, the fact that the exhaust recycle portion of the charge is cooled somewhat is beneficial in reducing nitrogen oxides from the exhaust. If the exhaust recycle gas is too cool, however, poor starting characteristics may be observed. FIG. 1 shows that the heat riser channel 14 extends to the hot plate 16 from both cylinder banks of the engine.

A conduit 18 having cooling fins 21 passes through hot plate 16, as best shown in FIG. 1, to recycle a portion of the gas passing through the heat riser into the induction system 8 through a recycle manifold 17 and circumferentially spaced openings 20. The conduit 18 passes through the intake manifold 19 as shown and is contacted by the cooler incoming air-fuel mixture to thereby effect heat exchange, thus resulting in cooling of the recycled exhaust gas. Conduit 18 passes into the upper end of the intake manifold 19 just below the carburetor 7 so that exhaust gas recycled through conduit 18 combines with the air-fuel mixture passing from the carburetor through the intake manifold 19 into combustion chambers through the intake ports. With the recycle entering the charge downstream from the carburetor, manifold vacuum may be utilized to draw recycle gas from heat riser 14 through conduit 18.

Figure 3:
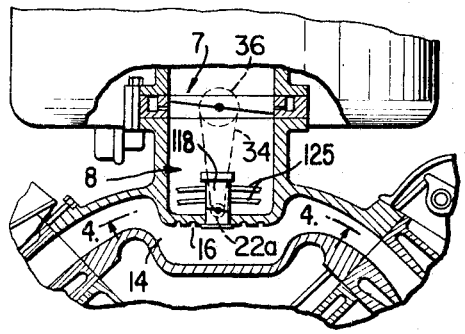
FIG. 3 shows, in partial section, another embodiment of my present invention using recycle distribution tubes.
Figure 4:
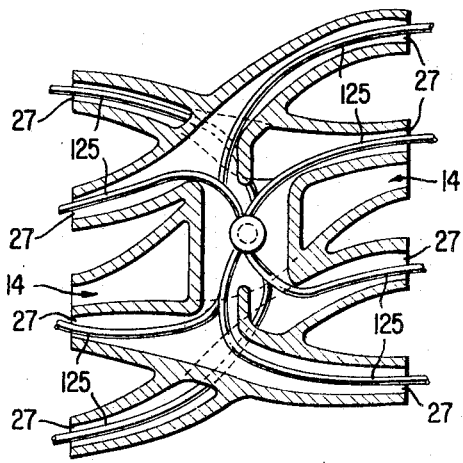
FIG. 4 is a plan view, partially in section, taken substantially through the intake manifold of FIG. 3.
Figure 5:
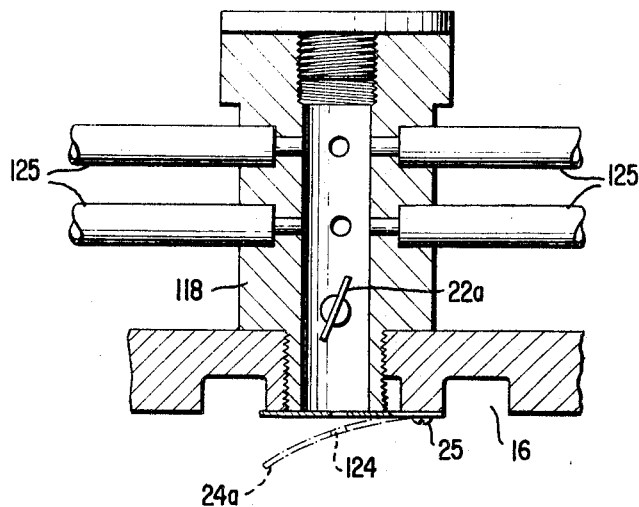
FIG. 5 is an enlarged view of the exhaust recycle member of FIG. 3.

In a second embodiment of my present invention, shown in FIGS. 3 to 5, the exhaust gas is recycled into the combustion chambers through a plurality of distribution tubes 125 directly to the combustion chambers through intake ports 27. A recycle control valve 22a may be inserted in the recycle member 118 below the distribution tubes 125 as shown in FIG. 5.

In the embodiment shown in FIG. 5 the bimetallic valve 24a contains an orifice 124 so that the bimetallic valve element 24a reduces the exhaust recycle into the induction system during warm-up but does not completely eliminate recycle since some recycle is effected through the orifice 124. In this embodiment it is desirable to recycle about 5 percent of the exhaust gas through the orifice 124 rather than the usual 15–25 percent which is recycled when the valve 24a is in open position as shown in phantom line in FIG. 5. This small amount of recycle during the warm-up period will be effective to heat the air-fuel mixture from an initial cold charge temperature of about 100° F. to about 150° F.

Valve 22 (or 22a) is positioned within conduit 18 (or member 118) and may be connected to a foot throttle of an internal combustion engine driven vehicle to control the amount of exhaust gas that is recycled into the intake manifold, as taught in my aforementioned patent. Preferably valves 22 and 22a are so coupled to the foot throttle valve 36 by coordinated operating means 34 that at idle throttle position the valve is substantially closed so that very little or substantially no exhaust gas is recycled into the engine through the intake manifold. As the carburetor throttle valve is opened to increase the speed of the engine, valve 22 gradually opens to recycle a proportionately larger amount of exhaust gas into the engine until at wide-open throttle where the volume of exhaust gas is greatest, a controlled maximum amount of exhaust gas is recycled into the combustion chambers through the intake ports 27. At floorboard position of the foot pedal where full power is desired for passing or rapid acceleration, valve 22 (or 22a) closes so that substantially no exhaust gas is recycled into the engine. By preventing the recycle of exhaust gas into the engine at floorboard position, the air-fuel mixture is effectively enriched so that full power is attained when needed. The effect of the amount of exhaust gas recycled into the engine on the reduction of nitrogen oxide in the exhaust gas in such a recycle system is discussed in my aforementioned U.S. Pat. No. 3,237,615.

Figure 2:
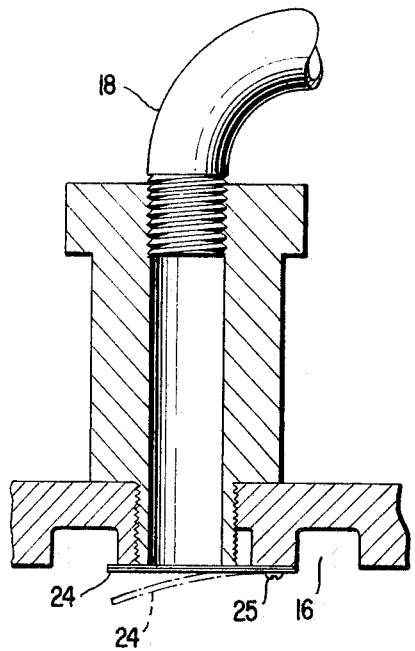
FIG. 2 is an enlarged view, partially in section, of the recycle conduit inlet and thermal valve therefor.

The valve-type control mechanism of this invention comprises a flexible, bimetallic, thermally responsive strip member 24, fixedly attached by one end to hot plate 16, as by welding one end of strip 24 to the hot plate or by means of a set screw 25. The other end of strip member 24 extends toward the open end of recycle member 18 and is movable between the positions shown in solid and dashed lines in FIGS. 3 and 4. When the temperature of the exhaust gases in the heat riser channel is above a predetermined level, strip member 24 is in the open or non-sealing position as shown by the dashed line of FIG. 2. When the temperature of the gases in heat riser channel is above a predtermined level, strip member 24 is in the open or non-sealing position as shown by the dashed line of FIG. 2. When the temperature of the gases in heat riser channel 14 is below a predetermined level, however, the uneven contraction of the metals in bimetallic strip member 24 causes the free end of strip 24 to move into sealing relationship with the lower end of conduit 18, as shown by the solid lines in FIG. 2, to prevent exhaust gases from flowing into the conduit from heat riser channel 14. Preferably, the bimetallic strip is mounted on hot plate 16 so that its free end remains in sealing relationship with conduit 18, as shown in FIG. 2, until the temperature of the air-exhaust gas mixture surrounding strip 24 in heat riser channel 14 reaches about 300° F. At 500° F. strip 24 is preferably fully opened so that maximum recycle of exhaust gas is obtained.

The thermally activated control mechanisms disclosed are exempletive of specific mechanisms which may be used to accomplish the basic objective of preventing recycling of exhaust gases when the temperature of the engine is below a predetermined level. The control mechanism may be activated by a sensor member which senses the temperature of various engine-associated components which correspond in temperature to the engine temperature. In addition to the described embodiments, for example, the control mechanism may be activated by sensing the water temperature in the engine cooling system. When such a device is used a water temperature of about 100° F. has been found most appropriate for permitting recycling. When the recycle valve thermal control mechanism is activated by rotation of the choke shaft or in conjunction with the choke thermal control device, it has been found preferable to permit recycling only when the choke is almost all the way open. It has been found that with the thermally responsive control device for recycle systems disclosed it normally takes only about two or three minutes for the engine to arrive at a temperature sufficient to open the recycle valve for recycling exhaust gases through the induction manifold.

Many modifications and variations of the invention, as hereinbefore set forth, may be made without departing from the spirit and scope thereof.

I claim:

1. In an exhaust recycle system for internal combustion engine driven vehicles wherein the engine has a plurality of combustion chambers and exhaust outlets from said combustion chambers; and air-fuel mixer device having a throttle valve; an induction manifold connecting said device to said combustion chambers;

means for recycling exhaust gases, said recycling means communicating with said exhaust outlets, and terminating in fluid communication with said induction manifold whereby exhaust gases are conveyed into said combustion chambers; and exhaust recycle valve means for controlling the quantity of exhaust gases conveyed into said combustion chamber, the improvement comprising thermal responsive means for preventing said exhaust recycle when the temperature of said engine is below a predetermined temperature to prevent recycle of exhaust gases until the temperature reaches said predetermined level, said thermal responsive means comprising a thermally activated bimetallic strip flap valve so mounted in association with said recycling means that said thermally activated bimetallic strip flap valve is in substantially fluid tight relationship with said recycling means when the temperature of said engine is below a predetermined temperature and is in non-fluid tight relationship wth said recycling means when the engine temperature is above said predetermined temperature.

2. The apparatus of claim 1 wherein said thermally activated bimetallic strip flap permits a reduced quantity of recycle prior to reaching said predetermined temperature to preheat the air-fuel mixture.

3. The apparatus of claim 2 wherein said preheat means is an orifice in said thermally activated bimetallic strip flap valve.

4. A system as defined in claim 1 wherein said exhaust outlets communicate with a heat riser channel and said outlets terminate in a single inlet into said heat riser channel and wherein said bimetallic strip flap valve is so mounted in said channel as to be in substantially fluid-tight relationship with said inlet when the temperature of the gas in said channel is below a predetermined temperature and in non-sealing relationship with said inlet when the temperature of said gas is above said predetermined temperature.

5. In an exhaust recycle system for an internal combustion engine driven vehicle wherein the engine has a plurality of combustion chambers and exhaust outlets from said combustion chambers, an air-fuel mixer device having a throttle valve and an induction manifold including intake ports, connecting said device to said combustion chambers, comprising, in combination:

a heat riser channel receiving a portion of the flow from said combustion chambers and being in fluid communication with a hot plate in said induction system over which said mixture from said air-fuel device is passed prior to entry into said combustion chambers, an outlet port in said hot plate for receiving exhaust gases from said heat riser channel, a plurality of recycle conduits communicating with said combustion chambers through said intake ports, conduit means for recycling said exhaust gas from said hot plate port to said conduits, valve means for controlling the quantity of said exhaust gas flowing from said heat riser through said conduits, a bimetallic flap valve positioned in said heat riser over said hot plate port and affixed on one side thereof to said hot plate and arranged to close off said port and recycle conduit means when the temperature of said engine is below a predetermined temperature to thereby prevent recycle of said gas from said heat riser through said recycle conduits, and open said port to the passage of exhaust gas from said heat riser through said recycle conduits when the temperature of said engine is above said predetermined temperature.

6. An exhaust recycle system for an internal combustion engine comprising in combination:

a plurality of combustion chambers, valved exhaust outlets leading from said combustion chambers, an air-fuel mixer device having a throttle valve, an induction manifold connecting said mixer device to said combustion chambers, a plurality of conduits communicating with said valved exhaust outlets and passing into heat exchange relationship with the interior of said induction manifold, said conduits terminating in said induction manifold whereby to convey exhaust gas into said combustion chambers, and valve means for controlling the flow of exhaust gas into said combustion chambers, and valve means for controlling the flow of exhaust gas into said conduits, and a bimetallic strip flap valve for reducing said exhaust recycle when the temperature of said engine is below a predetermined temperature.

7. An exhaust recycle system for an internal combustion engine comprising in combination:

a combustion chamber, valved exhaust outlet leading therefrom, an air-fuel mixer device having a throttle valve actuated by an accelerator mechanism having idle position, part-throttle positions, and floorboard position thereon, an induction system connecting said device to said combustion chamber and a conduit providing communication between said valved exhaust outlet and said induction system, means connected to said throttle valve accelerator mechanism for controlling the flow of said recycled exhaust gas into said induction system whereby said control means are substantially closed at said idle and floorboard positions and open for maximum recycle or said exhaust gas into said induction system at said part-throttle positions, and a bimetallic strip flap valve for reducing said exhaust recycle when the temperature of said engine is below a predetermined temperature.

References Cited
UNITED STATES PATENTS

| | | |
|---|---|---|
| Re. 22,994 | 4/1948 | Bicknell. |
| 1,829,875 | 11/1931 | Ross. |
| 1,860,641 | 5/1932 | Woolson. |
| 1,916,325 | 7/1933 | McAdams. |
| 2,633,837 | 4/1953 | Godfrey. |
| 3,135,253 | 6/1964 | Muhlberg. |
| 3,444,846 | 5/1969 | Sart et al. |

WENDELL E. BURNS, Primary Examiner